Dec. 29, 1936. W. C. GROENIGER 2,065,523
METHOD OF UNITING FLUID STREAMS AND DEVICE THEREFOR
Filed July 20, 1934 2 Sheets-Sheet 1
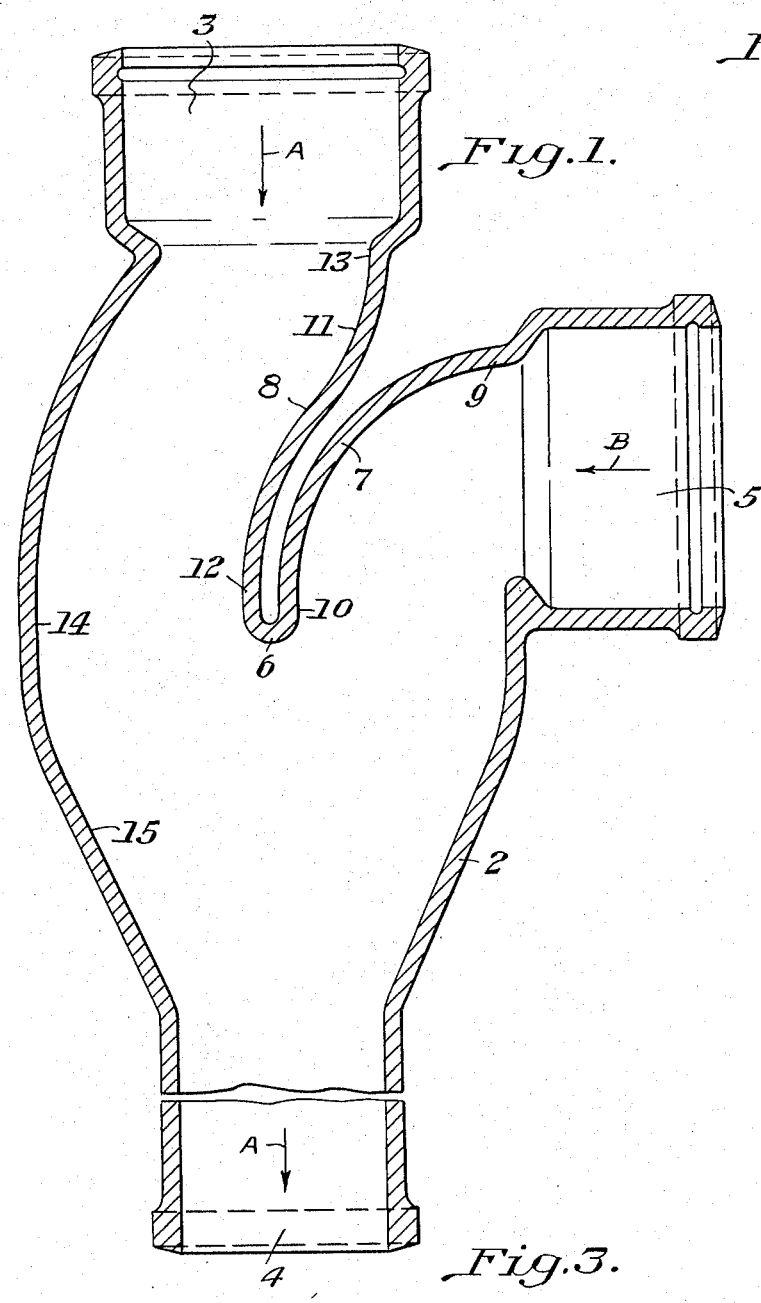
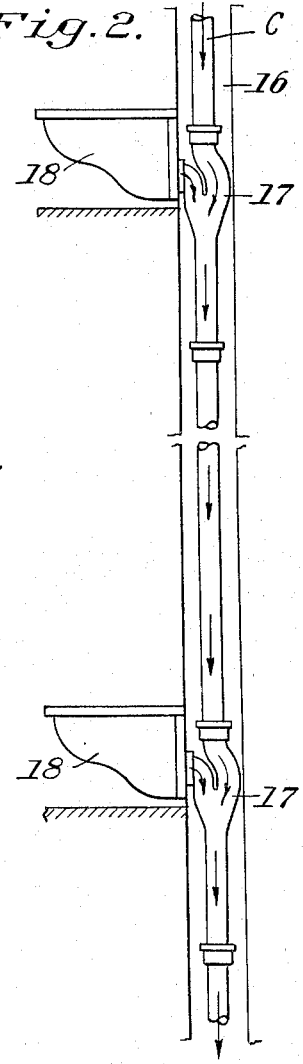
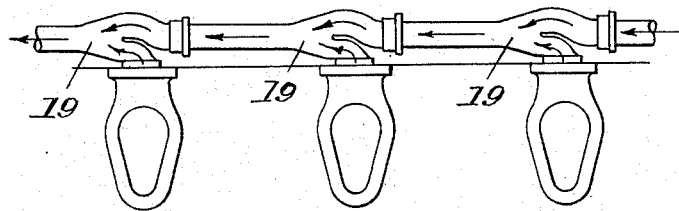
INVENTOR
William C. Groeniger
by his attorneys
Byrnes, Stebbins & Blenko Dec. 29, 1936. W. C. GROENIGER 2,065,523
METHOD OF UNITING FLUID STREAMS AND DEVICE THEREFOR
Filed July 20, 1934 2 Sheets-Sheet 2

INVENTOR
William C. Groeniger
by his attorneys
Byrnes, Stebbins & Blenko

Patented Dec. 29, 1936

2,065,523

UNITED STATES PATENT OFFICE 2,065,523

METHOD OF UNITING FLUID STREAMS AND DEVICE THEREFOR

William C. Groeniger, Columbus, Ohio, assignor to John B. Pierce Foundation, New York, N. Y., a corporation of New York Application July 20, 1934, Serial No. 736,220

6 Claims. (Cl. 285—210)

This invention relates broadly to methods of uniting fluid streams and to devices for use in carrying out such methods. It further relates to conduit connecting devices or fittings suitable for joining together two or more fluid carrying conduits such, for example, as drainage and sewerage systems, air conditioning systems, vacuum cleaning systems, etc.

Among the important considerations in connection with the flow of fluids, and particularly the flow of fluids in closed conduits or pipes, are the frictional resistance offered to the flowing fluids by fittings, connections and joints, and the interference with fluid flow occasioned by the introduction of fluid streams into moving bodies of fluid in closed conduits. The last mentioned consideration is of particular concern in the case of conduits into which branch streams are introduced transversely to the direction of fluid flow therein.

When a branch stream is introduced into a flowing body of fluid in a main the fluid entering the main from the branch normally mingles with the fluid moving in the main while the branch stream tends to cross the main fluid stream at an angle of from forty-five to ninety degrees. This has a serious effect in impeding the flow of fluid both in the main and in the branch and thus reducing the efficiency of the system.

An example of a system in which the impedance to the flow of fluid occasioned by the introduction of branch streams into main streams at a substantial angle thereto is of serious consequence is to be found in a building drainage system. More specifically, there may be a battery of water closets, urinals and lavatories which may be discharged into a common drain. As many as six to twelve or more of such fixtures may be thus connected. On account of the inherent nature of the use to which the system is put efficient removal of wastes from water closets, urinals, bath tubs, lavatories and other plumbing fixtures is essential. In addition to the speedy and safe removal of sewage and wastes drainage systems must also supply and discharge air through vent pipes.

When a standard T fitting is utilized for introducing fluid from a branch stream into a main, the fluid in the branch stream tends to cross the fluid moving in the main substantially at right angles, and the impedance thus offered to fluid flow is serious. In order to reduce such impedance to a certain extent it has heretofore been proposed, and in fact is now common, to utilize a Y fitting or what is known as a combination Y and ⅛ bend fitting for uniting two fluid streams. The use of fittings of this type enables introduction of the branch stream into the main stream at a considerably smaller angle so that the direction of flow of the fluid introduced into the main more nearly parallels the direction of flow of the fluid moving in the main. This, of course, to a certain extent reduces the impedance offered by the introduced fluid, but inasmuch as there must always be a substantial angle between the two conduits, the impedance cannot by the use of any ordinary fittings be substantially entirely eliminated.

In a building drainage system the wastes or sewage must be quickly conducted from the respective fixtures to the place of disposal with velocities which will guard against fouling and the deposit of solids and will prevent clogging, and provision must be made for adequate circulation of air in all conduits so as to avoid the danger of siphoning of liquid trap seals or the forcing of trap seals under conditions of ordinary use. Furthermore, the various fixtures are discharged intermittently and at varying rates, which presents a problem in the maintenance of air throughout the system and the avoidance of seal breakage.

The standard fittings heretofore in use consume an undesirably great amount of space, and due to this present difficulties in connection with installation and in many cases require special designing of surrounding parts of a building structure to accommodate them.

I provide methods of uniting fluid streams and devices for connecting a plurality of conduits carrying flowing fluid which solve in a remarkably efficient manner the problems above mentioned. I am enabled to substantially entirely eliminate the undesirable impedance offered when fluid streams are joined by ordinary fittings as heretofore commonly utilized. I accomplish the more perfect and even introduction of a branch stream into a main fluid stream and at the same time reduce the number of joints and the amount of extra piping necessary in closed systems, diminish leakage and reduce the weight and cost of the fittings required. Provision is made for proper venting of the system and the efficient and rapid movement of air therein so as to prevent seal breakage. At the same time I reduce the space required for installation of fittings and am enabled to utilize a smaller space for installation and to avoid to a great extent the provision of special surrounding structures to accommodate the piping.

I provide for introducing fluid from a branch into a main so that the fluid introduced will be moving substantially in the direction of flow of the fluid in the main. By this provision the energy of flowing fluids is employed to provide injector action by the fluid stream having the higher velocity which aspirates the fluid stream having the lower velocity, thus bringing about acceleration of flow and eliminating the undesirable impedance offered when fluid streams are joined by ordinary fittings as heretofore commonly utilized. The same effect is produced in connection with counterflow of air in liquid systems.

I provide a method of uniting a plurality of fluid streams into a common stream, comprising deflecting one of such first mentioned streams, before it mingles with another thereof, so as to direct it substantially in the direction desired for said common stream, and introducing another of such first mentioned streams into said deflected stream.

I provide a conduit connecting device comprising means for joining the device to each of a plurality of conduits so that material moving from the respective conduits is united within the device, and deflecting means within the device for causing material from a plurality of conduits to move generally in the same direction immediately previous to uniting. I provide a conduit fitting comprising a portion adapted to form a part of a generally continuous conduit and a connection extending from such portion, there being a deflecting device extending into the fitting at the angle between said portion and said connection and terminating at or near the axis of said generally continuous conduit.

Other details, objects and advantages of the invention will become apparent as the following description of certain present preferred embodiments thereof proceeds.

In the accompanying drawings I have shown certain present preferred embodiments of the invention, in which Figure 1 is a central longitudinal cross-sectional view through a conduit fitting;

Figure 2 is a diagrammatic elevational view illustrating use of fittings such as that shown in Figure 1 in a vertical conduit;

Figure 3 is a diagrammatic plan view illustrating the use of such fittings in a horizontal conduit;

Figure 4:
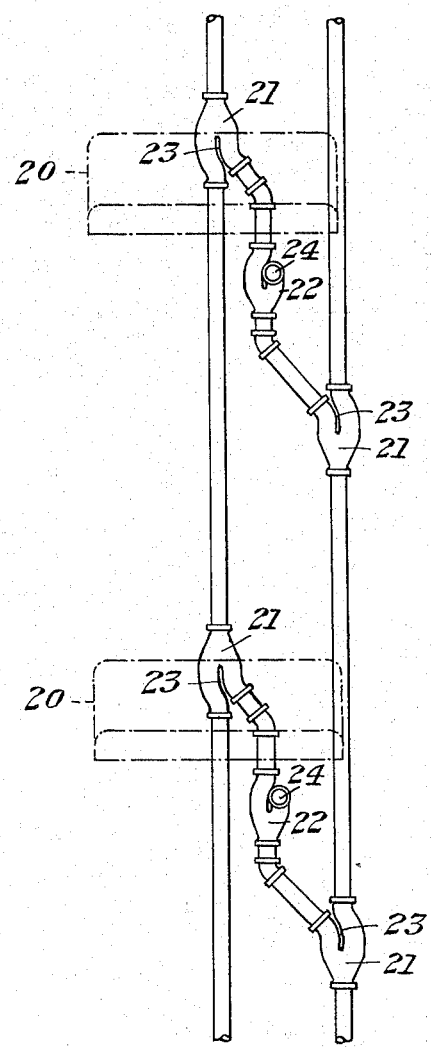
Figure 4 is a diagrammatic view of a fluid transmission system.

Referring more particularly to the drawings, Figure 1 shows a conduit fitting designated generally by reference numeral 2 having an inlet 3 and an outlet 4 for a main fluid stream moving generally in the direction of the arrows A and an inlet 5 for a branch fluid stream moving generally in the direction of the arrow B. The branch conduit extends generally at right angles to the main, and if the ordinary T fitting were utilized for making the connection the stream from the branch conduit would tend to cross the stream flowing in the main substantially at right angles, thereby seriously impeding the flow in the system. However, there is provided a deflecting device or wall portion 6 extending into the interior of the fitting and having oppositely disposed walls 7 and 8. The wall 7 is curvedly formed so as to change its direction smoothly through substantially ninety degrees, one extremity 9 thereof being disposed in substantially tangential relationship to the direction of flow of fluid from the branch stream into the fitting. The opposite extremity 10 of the wall 7 extends substantially in the direction of flow of fluid in the main,—that is to say, generally in the direction of the arrows A.

Fluid entering the fitting in the direction of the arrow B impinges against the wall 7, and by reason of the fact that the extremity 9 of such wall is disposed in substantially tangential relationship to the direction of flow of fluid thus entering the fitting, gradually and smoothly deflects the incoming fluid and causes it to change its direction through substantially ninety degrees and to leave the wall 7 at the portion 10 thereof while moving substantially in the direction of the arrows A.

The wall 8 is formed as a smooth reverse curve having an internally concave portion 11 and an internally convex portion 12. The extremity 13 of the portion 11 is disposed in substantially tangential relationship to the direction of flow of fluid in the main as it enters the fitting. The fluid is deflected by the portion 11 of the wall through a small angle, and then it is deflected back toward its normal direction of flow by the outside wall 14 of the fitting in conjunction with the wall portion 12. As the fluid moves forward it is deflected somewhat inwardly by the wall portion 15 so that it joins the fluid introduced from the branch conduit at a negligible angle and therefore in effect while the fluid from both conduits is moving substantially in the same direction.

The fluid from the branch is deflected so as to be moving substantially in the direction of flow of fluid in the main just previous to mingling of the two streams. Thus, when the streams come together in the body portion of the fitting their tendency is to assist each other in moving forward rather than to impede each other's progress, as would be the case if the streams were moving in substantially diverse directions at the time of mingling. The slight deflection of the main fluid stream out of and back into its normal direction of flow enables the deflection of the fluid from the branch stream before the two streams mingle. This deflection is smooth and gradual throughout, and the resistance thereby offered to flow of the main stream is negligible.

The form of the connections between the fitting and the conduits which it joins is immaterial, and while bells are shown in the embodiment of Figure 1, the connections may be made by screw threads or in any other desired manner without affecting the operation of the device. The deflecting device 6 preferably terminates at or near the axis of the inlet and outlet portions 3 and 4 for the main fluid stream which form portions of a substantially continuous conduit. This enables joining of the main and branch fluid streams at or near the axis of the conduit whereby a minimum of disturbance will occur. The respective streams will flow substantially together in the axial direction of the main conduit from the extremity of the deflecting device.

In Figure 2 there is diagrammatically illustrated a main conduit or drain 16 in which the normal flow of fluid is generally downwardly, as indicated by the arrows C. At intervals fittings 17 are introduced for the delivery of fluid into the drain. The fittings 17 are substantially identical with the fitting 2 of Figure 1 and function as above explained. Such fittings in the embodiment of Figure 2 may receive the waste from devices 18, which may be water closets, sinks, tubs, etc.

Figure 3 shows the application of fittings 19, which are substantially identical with the fittings 2 and 17, when laid in a substantially horizontally extending conduit and for introducing branch streams generally horizontally into the main. The fittings may be used with equal effectiveness in any position, either vertical, horizontal or at an angle to the vertical or horizontal, or both.

In Figure 4 are shown the drainage connections for a vertically arranged series of sinks, indicated diagrammatically at 20, such as might be used in apartment houses, office buildings or hotels. Fittings 21 (shown in detail and to enlarged scale in Figures 5 and 6) are utilized in both vent and drain stacks, and fittings 22 (shown in detail and to enlarged scale in Figures 7 and 8) are utilized, the fittings 21 and 22 embodying the same principle as the fittings shown in Figures 1, 2, and 3.

Figures 5, 6:
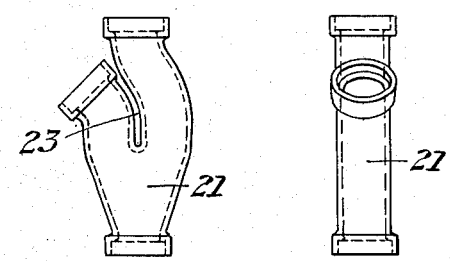
Figures 5 and 6 are views of a modified form of fitting.

The only substantial difference between the fittings 2 of Figure 1 and the fittings 21 of Figures 4, 5, and 6 is that the latter are designed for use in connecting conduits extending at somewhat less than a right angle to each other. Regardless of the angle between the conduits, the deflecting means, indicated at 23 in Figures 4 and 5, are effective in the same manner as above described with respect to the deflecting means 6 of Figure 1. Also, as shown in Figure 4, the fittings are adapted for use in systems in which the fluid flow therethrough is in either direction with respect to the position of the deflecting means.

Figures 7, 8:
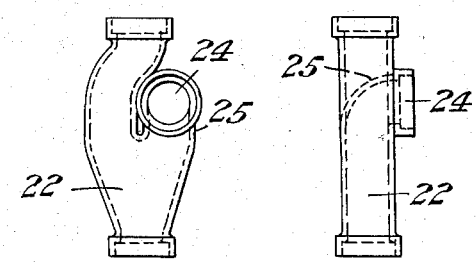
Figures 7 and 8 are views of another modified form of fitting.

The fittings 22 are similar in principle and construction to the fittings 2 and 21 except that the branch conduit is introduced from a direction such that it will intersect the plane of the main conduit. In Figure 4 the waste from each sink enters the side opening 24 of the corresponding fitting 22 and is deflected through substantially a right angle by deflecting means 25 (Figure 8). Thus the drain from each sink and the fluid moving through the main mingle with each other when moving substantially in the same direction without substantial impedance due to cross currents. The details of construction of the fittings 22 are clearly shown in Figures 7 and 8.

Figure 9:
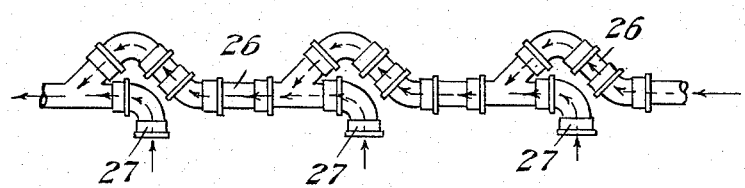
Figure 9 is a diagrammatic view similar to Figure 3 showing the utilization of ordinary fittings in the accomplishment of a general result sought.

In Figure 9 is shown diagrammatically a main 26 into which are introduced three branches 27. The system of Figure 9 is made up entirely of ordinary fittings and six joints are required for each connection, whereas when my fitting is used only one joint is necessary. Furthermore, the space required by the system shown in Figure 9 is almost twice that required by a system using my fittings.

The straight line through the fitting, as, for example, that indicated by the arrows A in Figure 1, is not always the main. The fluid flowing in the main may enter from the direction of the arrow B in Figure 1, the main making a right angle turn in the fitting, and the branch stream may be introduced in line with the new direction of the main.

The respective inflow and outflow ports may have any desired area and may be designed in accordance with standard practice. My construction is such that greatly increased efficiency of fluid flow is obtained both with respect to the main stream and with respect to venting. The space taken up by fittings of the type herein disclosed is much less than that consumed by the standard fittings previously in use.

While I have shown and described certain present preferred embodiments of the invention and certain methods of practicing the same, it is to be distinctly understood that the same is not limited thereto but may be otherwise variously embodied and practiced within the scope of the following claims.

I claim:

1. A conduit fitting comprising a body portion, a plurality of fluid passage means opening into said body portion at one end thereof, each of said fluid passage means being constructed of a continuous wall providing a passage of substantially uniform cross-sectional area, said continuous walls including wall portions serving as deflecting means for causing the flow of fluid through said fluid passage means alongside one another in generally parallel relationship at the zone of communication of the same with said body portion, the cross-sectional area of said body portion at said zone being substantially equal to the sum of the cross-sectional areas of said passages, the body portion being provided with an opening at the opposite end thereof, said deflecting wall portions having their outer surfaces exposed at the exterior of the fitting.

2. A conduit fitting comprising a body portion, a plurality of fluid passage means opening into said body portion, portions of the walls of said fluid passage means serving as deflecting means for causing the flow of fluid through said fluid passage means alongside one another in generally parallel relationship at the zone of communication of the same with said body portion, the cross-sectional area of said body portion at said zone being at least approximately as great as the sum of the cross-sectional areas of said fluid passage means, the body portion being tapered inwardly from opposite sides in the common plane of said fluid passage means from said zone in a direction away from said fluid passage means whereby it is reduced in cross-sectional area, and other fluid passage means opening into the reduced part of said body portion.

3. A conduit fitting comprising a body portion, a plurality of fluid passages opening into said body portion at one end thereof and merging into a single passage therewithin, the cross-sectional area of said single passage at the zone of merging of said first mentioned passages being at least approximately as great as the sum of the cross-sectional areas of said first mentioned passages, a fluid passage opening into said body portion at the end thereof opposite said first mentioned end, and means in the fitting common to said first mentioned fluid passages for bringing the same into substantial parallelism at said zone, said means forming part of the wall of the fitting and having its outer surface exposed at the exterior of the fitting.

4. A conduit fitting comprising a body portion, a plurality of fluid passages opening into said body portion at one end thereof and merging into a single passage therewithin, the cross-sectional area of said single passage at the zone of merging of said first mentioned passages being at least approximately as great as the sum of the cross-sectional areas of said first mentioned passages, a fluid passage opening into said body portion at the end thereof opposite said first mentioned end, and means in the fitting for bringing said first mentioned fluid passages into substantial parallelism at said zone, said means comprising integral spaced wall portions connected at their inner extremities and having the outer surfaces thereof exposed at the exterior of the fitting.

5. A conduit fitting comprising a body portion, a plurality of fluid passages opening into said body portion, said fluid passages at the zone of communication between the same and said body portion being disposed alongside one another in generally parallel relationship, the cross-sectional area of said body portion at said zone being at least approximately as great as the sum of the cross-sectional areas of said fluid passages, the body portion being tapered inwardly from opposite sides in the common plane of said fluid passages from said zone in a direction away from said fluid passages whereby it is reduced in cross-sectional area, and another fluid passage opening into the reduced part of said body portion.

6. A conduit fitting comprising oppositely disposed substantially coaxial fluid openings, a fluid passage communicating with said fitting intermediate said fluid openings, and another fluid passage communicating with one of said fluid openings and merging with said first mentioned fluid passage within the fitting, said second mentioned fluid passage being displaced laterally away from said first mentioned fluid passage adjacent the zone of merging therebetween a distance less than the diameter of said second mentioned fluid passage, said fluid passages being substantially parallel at said zone, each of said fluid passages being of substantially uniform cross-sectional area throughout.

WILLIAM C. GROENIGER.